Patented Feb. 12, 1924.

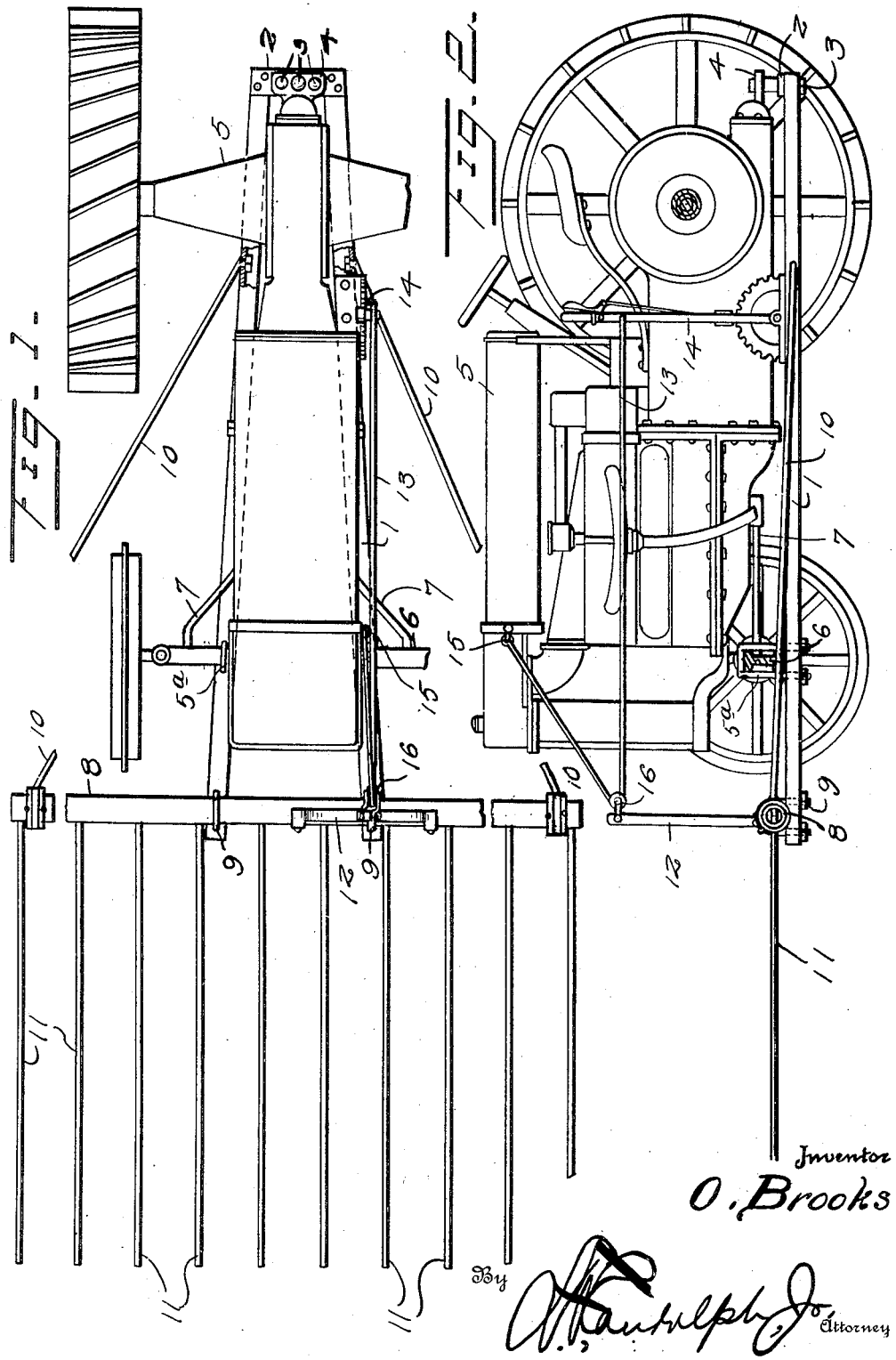

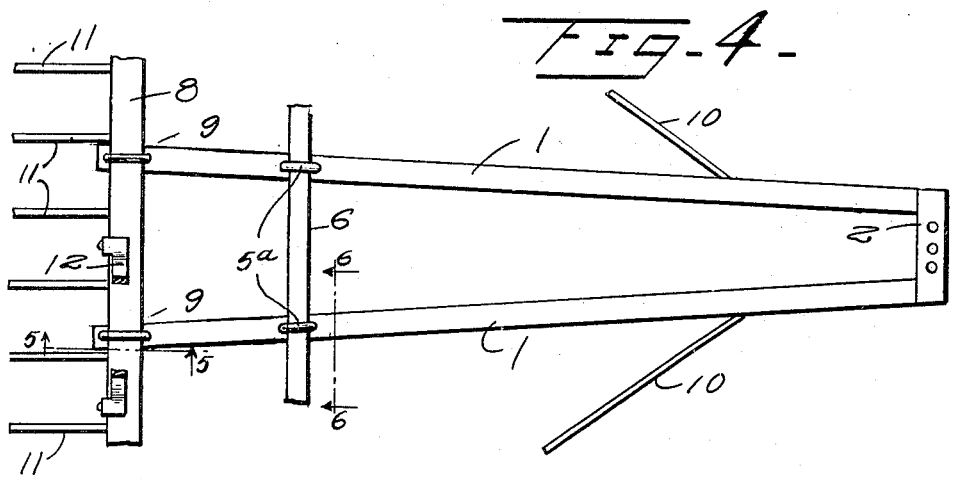
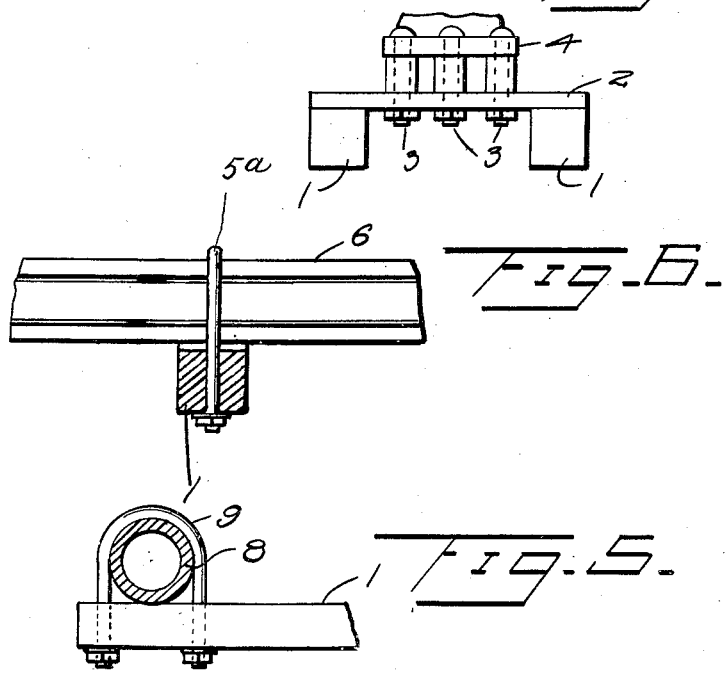
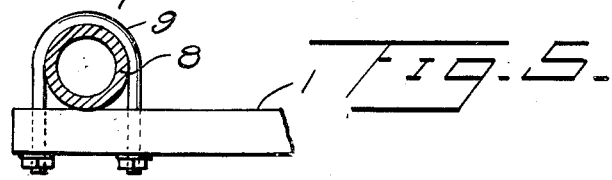

1,483,774

UNITED STATES PATENT OFFICE.

OMER BROOKS, OF STANTON, NEBRASKA.

TRACTOR-SWEEP HITCH.

Application filed July 25, 1922. Serial No. 577,270.

*To all whom it may concern:*

Be it known that I, OMER BROOKS, a citizen of the United States, residing at Stanton, in the county of Stanton and State of Nebraska, have invented certain new and useful Improvements in Tractor-Sweep Hitches; and I do hereby declare the following to be a full, clear, and exact description of the invention, such as will enable others skilled in the art to which it appertains to make and use the same.

This invention relates to a sweep or rake and means for attaching the same to a tractor.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view showing the invention applied,

Figure 2 is a side elevation thereof,

Figure 3 is a detail view showing the manner of connecting the sweep or rake to the rear portion of the tractor, Figure 4 is a plan view of the rake alone, and Figures 5 and 6 are sectional views taken respectively on lines 5—5 and 6—6 of Figure 4.

Corresponding and like parts are referred to in the following description and designated in the several views of the drawings by like reference characters.

The sweep or rake comprises longitudinally disposed draft beams 1 which are arranged with their front ends laterally spread a greater distance than their rear ends. A plate 2 connects the rear or converging ends of the beams 1 and has openings to receive the bolts or fastenings 3, whereby it is attached to the hitch plate 4 of the tractor 5. The beams 1 have their forward portions clamped at 5ª or otherwise secured to the front axle 6 and disposed in any preferred and convenient way relatively thereto and to the radius rods 7 of the tractor. The head of the sweep or rake may consist of a pipe 8 or other form of bar to which the front ends of the beams 1 are pivotally connected by means of U-bolts 9. Braces 10 connect the outer ends of the head 8 with the rear portions of the beams, said braces having pivotal connection with the pipe 8 to admit of the latter turning freely. The teeth 11 may be of any construction and extend forwardly from the head 8. A standard 12 of substantially V-form extends upwardly from the head 8 and a cord 13, or like part, connects the upper end thereof with an operating lever 14 mounted upon one of the beams 1 and extending within convenient reach of the driver's seat, whereby the part 8 may be turned to raise or lower the teeth 11, as required. One end of the cord 13 is secured to the tractor, at 15, and passed around a pulley 16 on the standard 12, the other end being attached to the lever 14.

It will be understood that the arrangement is such that the sweep or rake is disposed forward of the tractor and operates in advance thereof.

What is claimed is:

1. An appliance of the character specified comprising forwardly diverging beams, a plate connecting the converging ends of the beams and adapted to couple the same to the hitch plate of a tractor, means coupling the beams to the front axle of the tractor, a sweep head having pivotal connection with the front ends of said beams, braces between the outer ends of the sweep head and the rear portions of the said beams, teeth extending forwardly from the sweep head, and means for pivotally adjusting the latter to raise or lower the teeth.

2. An appliance of the character specified comprising forwardly diverging beams, a plate connecting the converging ends of the beams and adapted to couple the same to the hitch plate of a tractor, means coupling the beams to the front axle of the tractor, a sweep head having pivotal connection with the front ends of said beams, braces between the outer ends of the sweep head and the rear portions of the said beams, teeth extending forwardly from the sweep head, a standard extending upwardly from the sweep head, an operating lever mounted upon one of said beams, and connecting means between the operating lever and standard whereby to pivotally adjust the sweep head and effect a raising or a lowering of the teeth.

In testimony whereof I affix my signature in presence of two witnesses.

OMER BROOKS.

Witnesses:
H. D. MILLER,
A. P. PILGER.